United States Patent [19]
Fitzpatrick

[11] 3,799,329
[45] Mar. 26, 1974

[54] HARPOON-TYPE CONVEYOR

[75] Inventor: Daniel T. Fitzpatrick, Kalamazoo, Mich.

[73] Assignee: Prab Conveyors, Inc., Kalamazoo, Mich.

[22] Filed: July 24, 1972

[21] Appl. No.: 274,435

[52] U.S. Cl. .............................................. 198/221
[51] Int. Cl. ............................................ B65g 25/08
[58] Field of Search .......... 198/221, 226, 224, 223; 308/3 R

[56] References Cited
UNITED STATES PATENTS
1,122,409  12/1914  Mumford ........................... 308/3 R
2,540,670  2/1951  Hoenecke ...................... 198/226 X FOREIGN PATENTS OR APPLICATIONS
25,519  7/1963  Germany .......................... 198/221
1,111,989  11/1955  France .............................. 308/3 R Primary Examiner—Richard E. Aegerter
Assistant Examiner—Douglas D. Watts
Attorney, Agent, or Firm—Gordon W. Hueschen; John T. Reynolds

[57] ABSTRACT

A harpoon-type conveyor provided with self-aligning, readily replaceable bearing inserts which support a reciprocating hollow conveyor rod having mounted thereon an appropriate conveying means. The hollow conveyor rod has a generally square transverse cross-section and is slidably supported at the inner surfaces thereof by a bearing insert having a generally octagonal transverse cross-section.

5 Claims, 5 Drawing Figures

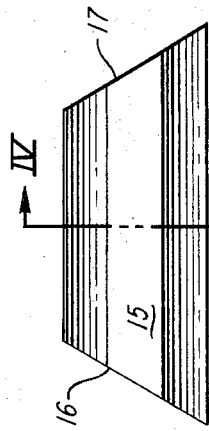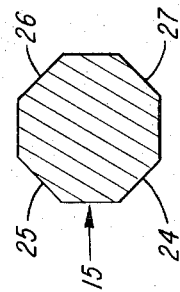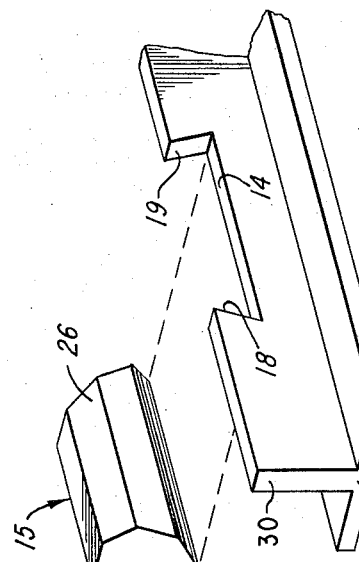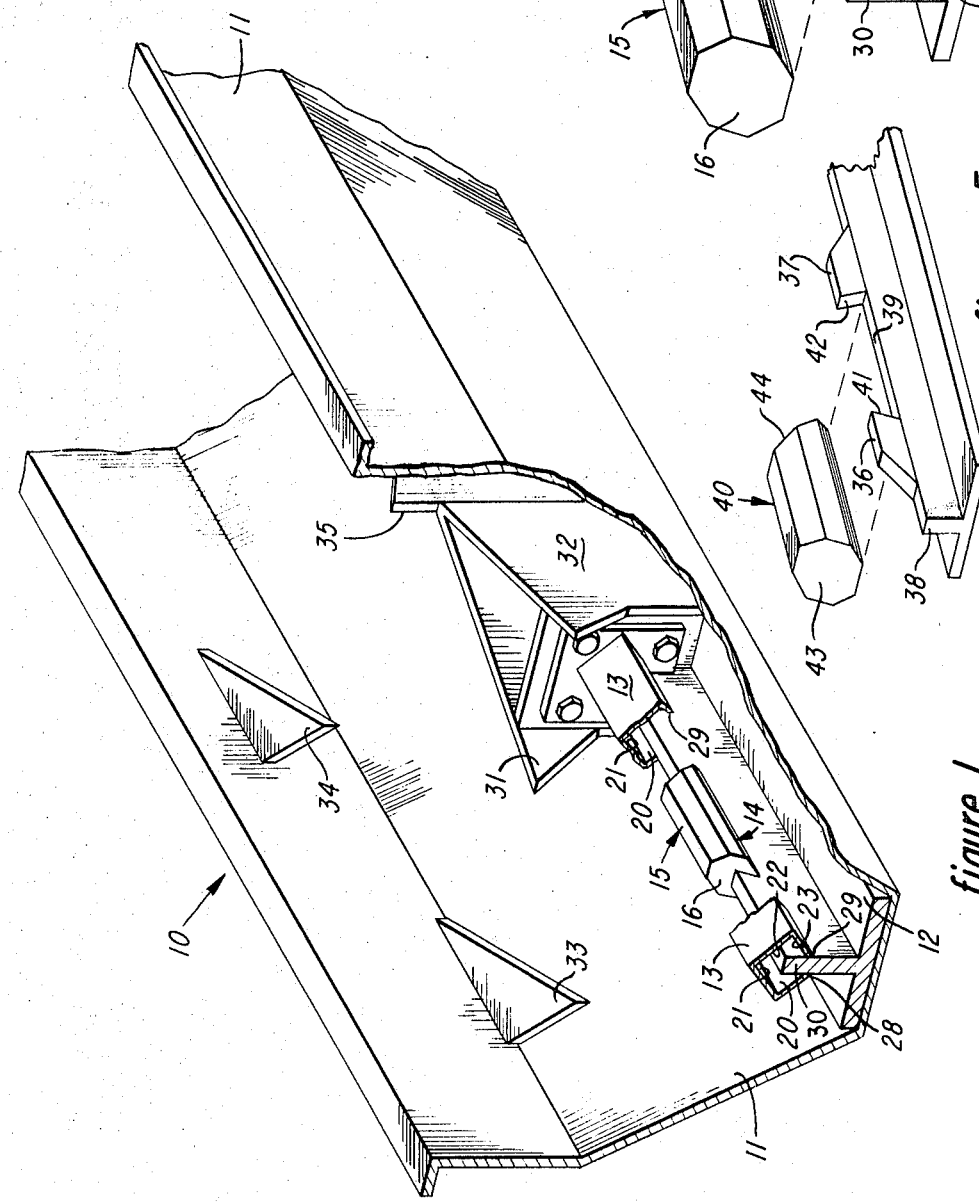

3,799,329

HARPOON-TYPE CONVEYOR

BACKGROUND OF THE INVENTION

This invention relates to conveyors. More particularly, this invention relates to the so-called harpoon-type conveyors.

A harpoon-type conveyor generally comprises one or more pairs of pushing blades arranged in a V-shaped configuration and mounted on a conveyor rod slidably positioned for reciprocating movement within a trough-shaped housing. The conveyor rod carrying the pushing blades is usually referred to as the harpoon tube or the harpoon. Conveyors of this general type are particularly well suited for transporting of metal or plastic chips generally produced during manufacturing processes on machine tools such as lathes, milling machines, drills, gear hobbers, boring mills, and the like. Also, inasmuch as in most instances during the aforementioned machining operations cutting and/or cooling liquids are used, the trough-shaped housing of the harpoon conveyor is frequently utilized as a transport conduit for spent cutting and/or cooling liquids.

However, where conveyor rods of substantial length are employed, the harpoon tube tends to rise as a result of fine material building up in the trough as chips or turnings are conveyed down the trough, thereby causing undesirable flexing of the tube and possibly binding. Moreover, wear on the sliding surfaces of the harpoon tube and its supporting rail is a problem.

It is an object of the present invention to alleviate the foregoing drawbacks and to provide a harpoon-type conveyor where the harpoon tube reciprocates along substantially the same longitudinal axis independently of conveyor length or loading.

It is a further object of the present invention to provide a harpoon-type conveyor where wear is concentrated in readily accessible spots thereby greatly facilitating maintenance operations.

Yet another object of this invention is to provide a harpoon conveyor having readily replaceable and self-aligning bearings.

Still other objects of this invention will present themselves to the skilled artisan upon reference to the ensuing specification, the drawing, and the claims.

SUMMARY OF THE INVENTION

The present invention contemplates a harpoon-type conveyor which comprises a conveyor trough means, an elongated rail means fixedly secured to the bottom of said trough means and projecting upwardly therefrom, a bearing insert means mounted on the elongated rail means, a reciprocating, hollow conveyor rod mounted on said elongated rail means and substantially surrounding the bearing insert means, conveying means mounted on the conveyor rod for movement therewith, and a plurality of substantially horizontal, stationary barb means mounted on the inner walls of the conveyor trough means.

The elongated rail means is provided with a plurality of spaced notches at the upper edge of the rail means which serve to receive and removably hold a plurality of bearing insert means. The reciprocating, hollow conveyor rod has a generally square transverse cross-section and is provided with an elongated slot-like opening which extends longitudinally along the lower portion of the conveyor rod. The slot-like opening has a pair of edges which are laterally spaced and which receive the elongated rail means therebetween. The hollow conveyor rod substantially surrounds the bearing insert means and is slidably supported by the bearing insert means at the inner surfaces of the conveyor rod. The transverse cross-section of the bearing insert means is substantially a regular octagon.

BRIEF DESCRIPTION OF THE DRAWINGS

In the drawings,

FIG. 1 is a fragmentary perspective view of a harpoon-type conveyor embodying the present invention and partially broken away to show interior detail;

FIG. 2 is a fragmentary perspective view showing a notch in an elongated rail adapted to receive a bearing insert of the present invention;

FIG. 3 is a side elevational view of the bearing insert;

FIG. 4 is a sectional elevation taken along line IV — IV in FIG. 3 and showing the transverse cross-section of the bearing insert; and FIG. 5 is a fragmentary perspective view similar to that of FIG. 2 and showing a notch on the upper edge of an elongated rail.

DESCRIPTION OF THE PREFERRED EMBODIMENTS

Referring to FIG. 1, harpoon conveyor 10 comprises conveyor trough 11 to the bottom of which is fixedly secured an elongated rail means such as rail or slide 12 having an inverted-T configuration. Rail 12 projects upwardly from the bottom of trough 11 and reciprocating, hollow conveyor rod 13 is mounted thereon.

Rail 12 is provided with a plurality of spaced notches such as notch 14 (FIG. 2) which is adapted to receive and removably hold bearing insert 15. Preferably the notches such as notch 14 have a generally obeliscoid configuration, i.e., the cut-out portion thereof resembles a frustum of a rectangular pyramid. Bearing insert 15, on the other hand, is provided with matching, upwardly-tapering end surfaces 16 and 17 (FIGS. 2 and 3) that engage complementary surfaces 18 and 19 of notch 14 and retain bearing insert 15 removably but firmly in place. By virtue of this arrangement, bearing insert 15 is also inherently self-aligning with respect to hollow conveyor rod 13 which substantially surrounds the conveyor bearing inserts.

Instead of providing cut-outs which serve as the mounting notches for the bearing insert means at the upper edge of the rail means, mounting notches can also be provided as shown in FIG. 5 where a pair of shaped lugs such as lugs 36 and 37 are attached in a spaced relationship relative to each other to elongated rail or slide 38 by welding or other suitable means of affixation and provide notch 39 therebetween of substantially the same configuration as notch 14 in FIGS. 1 and 2. Bearing insert 40 is received in notch 39 and notch surfaces 41 and 42 engage respective complementary surfaces 43 and 44 of bearing insert 40, thereby holding bearing insert 40 removably but firmly in place.

As can be seen from FIG. 1, reciprocating conveyor rod 13 has a generally square transverse cross-section and is slidably supported on bearing insert 15 at inner surfaces 20, 21, 22 and 23. More particularly, inner surface 20 slides on surface 24 of bearing insert 15; inner surface 21 slides on surface 25; inner surface 22 slides on surface 26, and inner surface 23 slides on surface 27 (FIG. 4). Conveyor rod 13 is also provided with an elongated slot-like opening, having edges 28 and 29, which extends longitudinally along the lower portion of rod 13. Edges 28 and 29 are laterally spaced so as to receive upwardly-projecting portion 30 of rail 12 therebetween.

A pair of pushing blades 31 and 32 are mounted on conveyor rod 13 so as to form a V-shaped transport member which serves as a convenient conveying means for chips as conveyor rod 13 reciprocates. Transport of chip bundles along trough 11 is further aided by a plurality of substantially horizontal, stationary barbs such as barbs 33 and 34. These barbs permit a chip bundle to slide by during the forward stroke of the harpoon tube comprising conveyor rod 13 and pushing blades such as 31 and 32 but prevent backward motion by the chip bundle during the return stroke of the harpoon tube. Substantially vertical barbs such as barb 35 can be provided on conveyor rod 13, if desired.

The number of V-shaped trasnport members that can be mounted on conveyor rod 13 in a spaced relationship relative to each other varies depending on the particular operating needs in a given industry. Similarly, conveyor rod 13 can be made as a single hollow rod or can be made in sections that are suitably bolted together, depending on the conveyor length desired. Harpoon conveyors as long as 500 feet, or longer, can be readily manufactured, and a preferred section length is in the range of about 10 feet to about 30 feet. The number and spacing of bearing inserts, and thus the notches in rail 12, is not critical and is largely determined by rigidity of conveyor rod 13 and, of course, by the intended end use of the conveyor. Usually, bearing inserts are spaced 20 inches to 40 inches apart. Stroke of the harpoon tube can range from about 2 feet to about 5 feet, as desired, and reciprocating motion can be imparted thereto by any convenient mechanical or hydraulic drive.

The foregoing discussion and the drawings are intended as illustrative but are not to be construed as limiting. Still other variations and rearrangements of parts within the spirit and scope of the present invention will readily become apparent to one skilled in the art.

I claim:

1. Harpoon-type conveyor which comprises
a conveyor trough means;
an elongated rail means extending longitudinally in said trough means, fixedly secured to the bottom of said trough means and projecting upwardly therefrom, and provided with a plurality of spaced notches at the upper edge of said rail means;
a bearing insert means removably held in each of said spaced notches and having a transverse cross-section which is substantially a regular octagon;
a reciprocating, hollow conveyor rod having a generally square transverse cross-section and an elongated slot-like opening extending longitudinally along the lower portion thereof and slidably mounted on said elongated rail means, said slot-like opening having a pair of edges laterally spaced sufficiently to receive said rail means therebetween, and said hollow conveyor rod substantially surrounding said bearing insert means and being slidably supported by said bearing insert means at the inner surfaces of the hollow conveyor rod;
conveying means mounted on said conveyor rod for movement therewith; and
a plurality of substantially horizontal, stationary barb means mounted on the inner walls of said conveyor trough means.

2. The harpoon-type conveyor in accordance with claim 1 wherein said notches are of a generally obeliscoid configuration and wherein said bearing insert means is provided with matching, upwardly-tapering end surfaces removably engaging said notches.

3. The harpoon-type conveyor in accordance with claim 2 wherein said notches are provided by cut-outs in the upper edge of said elongated rail means.

4. The harpoon-type conveyor in accordance with claim 2 wherein said notches are provided by pairs of spaced lugs attached to the upper edge of said elongated rail means.

5. The harpoon-type conveyor in accordance with claim 1 wherein said conveying means comprises spaced V-shaped transport members mounted on said conveyor rod.

* * * * *